US008533325B2

(12) United States Patent
Luu et al.

(10) Patent No.: US 8,533,325 B2
(45) Date of Patent: *Sep. 10, 2013

(54) PROVISIONING FOR ENTERPRISE SERVICE

(71) Applicant: Research In Motion Limited, Waterloo (CA)

(72) Inventors: Lap Luu, Markham (CA); Gibran Siddique, Toronto (CA)

(73) Assignee: BlackBerry Limited, Waterloo (CA)

( * ) Notice: Subject to any disclaimer, the term of this patent is extended or adjusted under 35 U.S.C. 154(b) by 15 days.

This patent is subject to a terminal disclaimer.

(21) Appl. No.: 13/686,530

(22) Filed: Nov. 27, 2012

(65) Prior Publication Data

US 2013/0084840 A1 Apr. 4, 2013

Related U.S. Application Data

(63) Continuation of application No. 12/837,681, filed on Jul. 16, 2010, now Pat. No. 8,370,484.

(60) Provisional application No. 61/328,543, filed on Apr. 27, 2010.

(51) Int. Cl.
G06F 15/173 (2006.01)

(52) U.S. Cl.
USPC ........................................................ 709/224

(58) Field of Classification Search
USPC ......................................... 709/224, 227, 229
See application file for complete search history.

(56) References Cited

U.S. PATENT DOCUMENTS

| 6,728,355 | B2 | 4/2004 | Kowalski |
| 2003/0016811 | A1 | 1/2003 | Milton |
| 2003/0119492 | A1 | 6/2003 | Timmins et al. |
| 2007/0259688 | A1 | 11/2007 | Forte |
| 2008/0189177 | A1 | 8/2008 | Anderton et al. |
| 2008/0268825 | A1 | 10/2008 | Allen et al. |
| 2010/0217953 | A1* | 8/2010 | Beaman et al. ................ 711/216 |

FOREIGN PATENT DOCUMENTS

WO 9853599 11/1998

OTHER PUBLICATIONS

European Search Report mailed Nov. 18, 2010, in corresponding European patent application No. 10169909.8.
Mehlhorn, K. Sanders, P. "Algorithms and Data Structures: The basic toolbox", Jul. 23, 2008. Springer, XP002605865, ISBN: 3540779779 pp. 81-98, p. 81-p. 84.

(Continued)

*Primary Examiner* — Jason Recek
(74) *Attorney, Agent, or Firm* — Novak Druce Connolly Bove + Quigg LLP

(57) ABSTRACT

Identifying an incoming call as from a mobile device of an enterprise communication system. Creating a first list relating mobile devices of the enterprise communication system with Public Land Mobile Network (PLMN) number of the device. Creating a hashmap comprising keys. Each key comprising the last n digits assigned as a PLMN number to at least one mobile device of the enterprise communication system. The hashmap further comprising a plurality of buckets. Each bucket corresponding to a key, and comprising a second list identifying each enterprise-associated mobile device having a PLMN number ending with the key. Receiving an Automatic Number Identification (ANI) number of an call incoming to the enterprise communication system. Retrieving at least one bucket corresponding to a key comprising the last n digits of the ANI number. Searching the retrieved bucket for the unique identifier associated with the full PLMN number.

21 Claims, 5 Drawing Sheets

(56) References Cited

OTHER PUBLICATIONS

Maurer W. D. et al. "Hash table methods", ACM computing surveys, ACM, New York, NY US, US, vol. 7, No. 1, Mar. 1, 1975 pp. 5-19, XP009022942, ISSN: 0360-0300, DOI:DOI:10. 1145/356645.

Cormen T. et al.; "Introduction to Algorithms, hash tables", Jan. 1, 2001, Introducing to Algorithms: Cambridge, MA:MIT Press, US, pp. 221-230, XP002524061, ISSBN: 978-0-262-03293-3.

Office Action mailed Dec. 17, 2012, in corresponding Canadian patent application No. 2,735,872.

* cited by examiner

PROVISIONING FOR ENTERPRISE SERVICE

CROSS-REFERENCE TO RELATED APPLICATIONS

This application is a continuation application of U.S. patent application Ser. No. 12/837,681 filed on Jul. 16, 2010, now U.S. Pat. No. 8,370,484, which claims the benefit of U.S. Provisional Application No. 61/328,543 filed on Apr. 27, 2010, each of said applications are expressly incorporated by reference herein in their entirety.

FIELD

The technology disclosed herein (the "technology") relates to communication system configuration. Exemplary embodiments of the technology relate to determining a communications path between an enterprise-associated mobile communications device and an enterprise resource.

BRIEF DESCRIPTION OF THE DRAWINGS

Reference will now be made, by way of example, to the accompanying drawings which show example embodiments of the present application.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the technology. For instance, features described as part of one embodiment can be used on another embodiment to yield a still further embodiment. Thus, it is intended that the present technology cover such modifications and variations that come within the scope of the technology.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
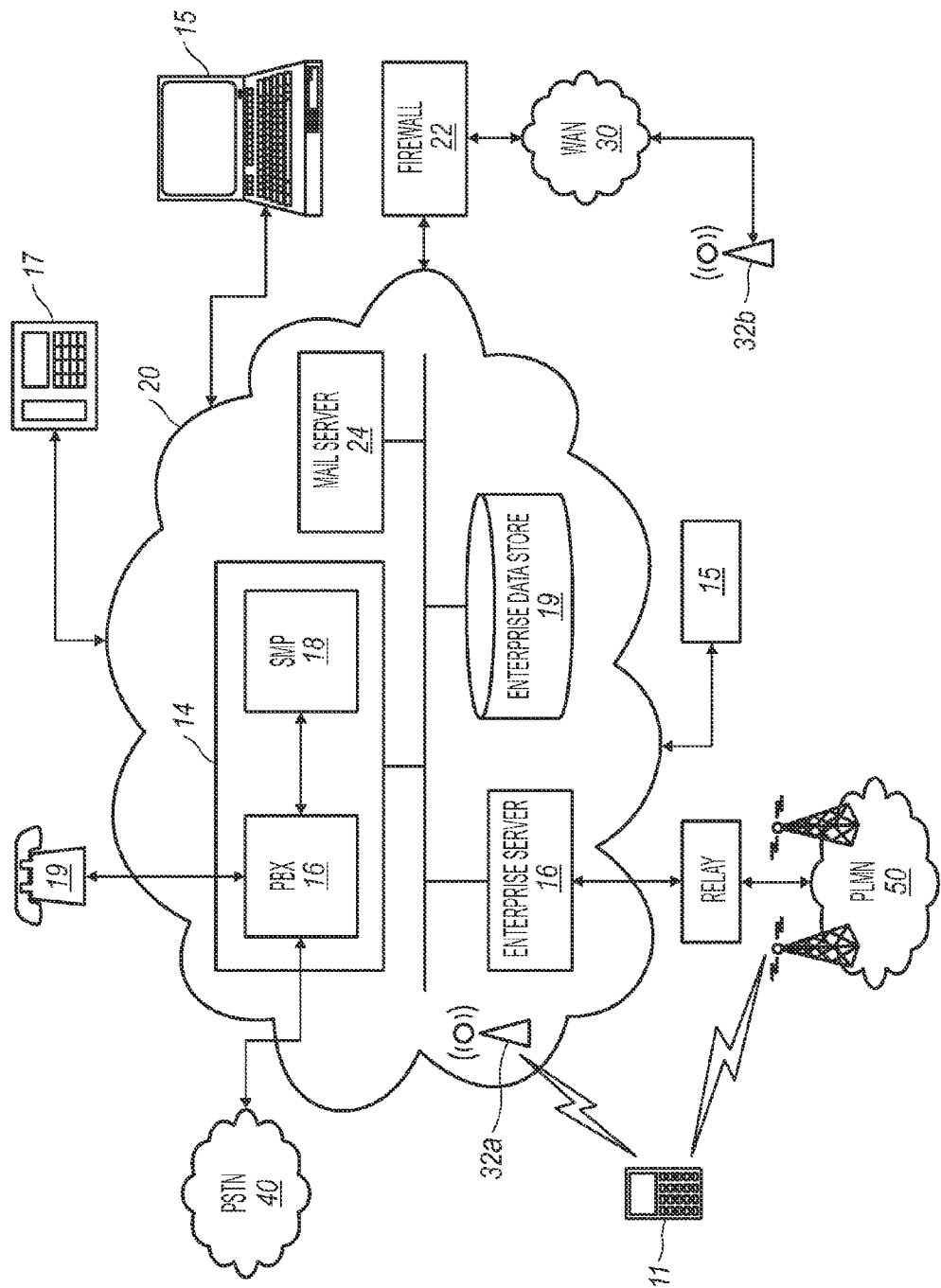
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as a user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is information such as: message address information, such as an e-mail address; and enterprise telephone exchange, e.g., a phone exchange that can be associated with a digital telephone set, e.g., 17. Information on users of the enterprise network 24 and its resources can be stored in an enterprise data store 19, e.g., implemented with Microsoft® Active Directory. Messages addressed to a user message address are stored on the enterprise network 20 in the mail server 24. The messages may be retrieved by a user using a messaging application, such as an e-mail client application. The messaging application may be operating on a user's computer 15 connected to the enterprise network 20 within the enterprise. In some embodiments, a user may be permitted to access stored messages using a remote computer, for example at another location via the WAN 30 using a VPN connection. Using the messaging application, a user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to a user's mobile device 11 and to relay incoming e-mail messages composed and sent via the mobile device 11 to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on a computer 15.

As is typical in many enterprises, the enterprise network 20 includes a Private Branch eXchange system (although in various embodiments the PBX may be a standard PBX or an IP-PBX, for simplicity the description below uses the term PBX system to refer to both) 16 having a connection with the PSTN 40 for routing incoming and outgoing voice calls for the enterprise. The PBX system 16 is connected to the PSTN 40 via DID trunks or PRI trunks, for example. The PBX system 16 may use ISDN signaling protocols for setting up and tearing down circuit-switched connections through the PSTN 40 and related signaling and communications. In some embodiments, the PBX system 16 may be connected to one or more conventional analog telephones 19. The PBX system 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX system 16 to the PSTN 40 or incoming from the PSTN 40 to the PBX system 16 are typically circuit-switched calls. Within the enterprise, e.g., between the PBX system 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX system 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX system 16, and, in some embodiments, the DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
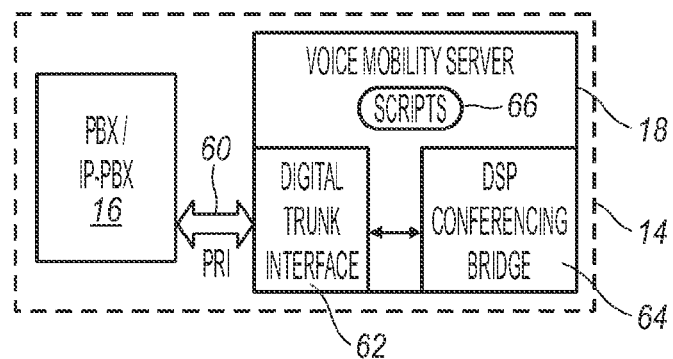
FIG. 2 shows, in block diagram form, further details of an embodiment of the enterprise communication platform.
Figure 3:
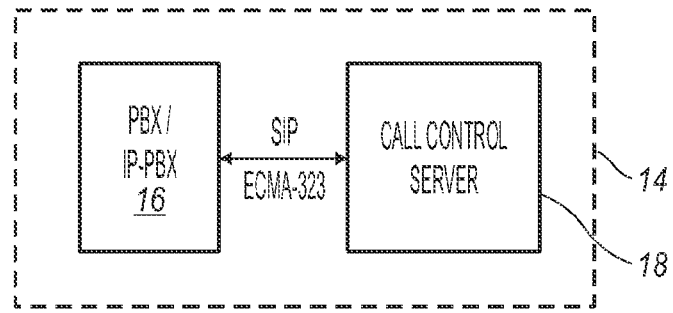
FIG. 3 shows another embodiment of the enterprise communications platform.
Figure 4:
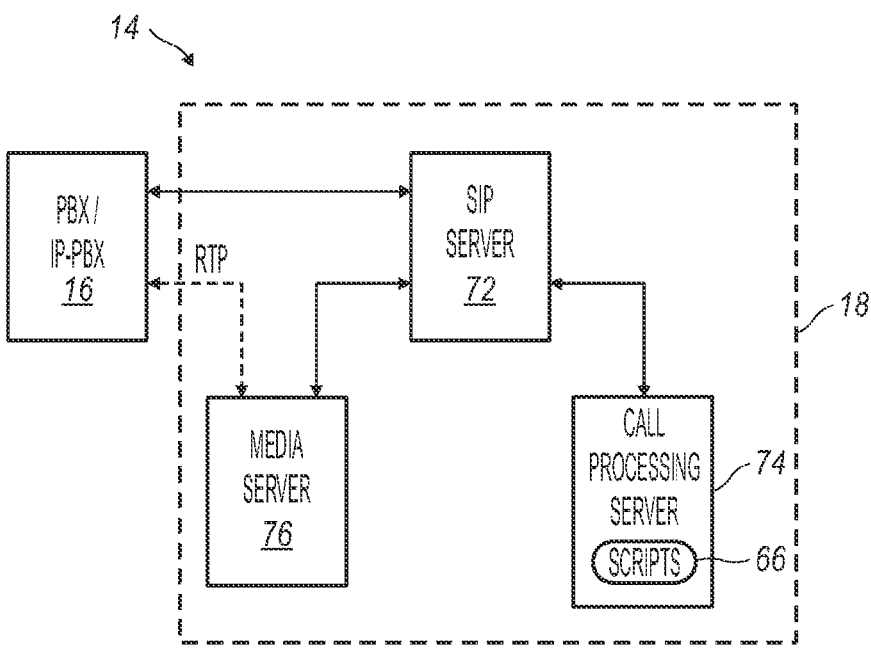
FIG. 4 shows yet another embodiment of the enterprise communications platform.

Reference is now made to FIGS. 2 to 4, which show example embodiments of the enterprise communications platform 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX system 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX system 16 and the SMP 18.

In this embodiment, the SMP 18 assumes control over both call processing and the media itself. This architecture may be referred to as "First Party Call Control". Many of the media handling functions normally implemented by the PBX system 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in memory and executed by the processor of the SMP 18. The scripts 66 may implement call flow logic, business logic, user preferences, call service processes, and various feature applications.

FIG. 3 shows another embodiment in which the PBX system 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX system 16, for example through the LAN, enabling packet-based communications and, more specifically, IP-based communications. In one embodiment, communications between the PBX system 16 and the call control server 18 are carried out in accordance with SIP. In other words, the call control server 18 uses SIP-based communications to manage the set up, tear down, and control of media handled by the PBX system 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP). Other architectures or configurations for the enterprise communications system 14 will be appreciated by those ordinarily skilled in the art.

Figure 5A:
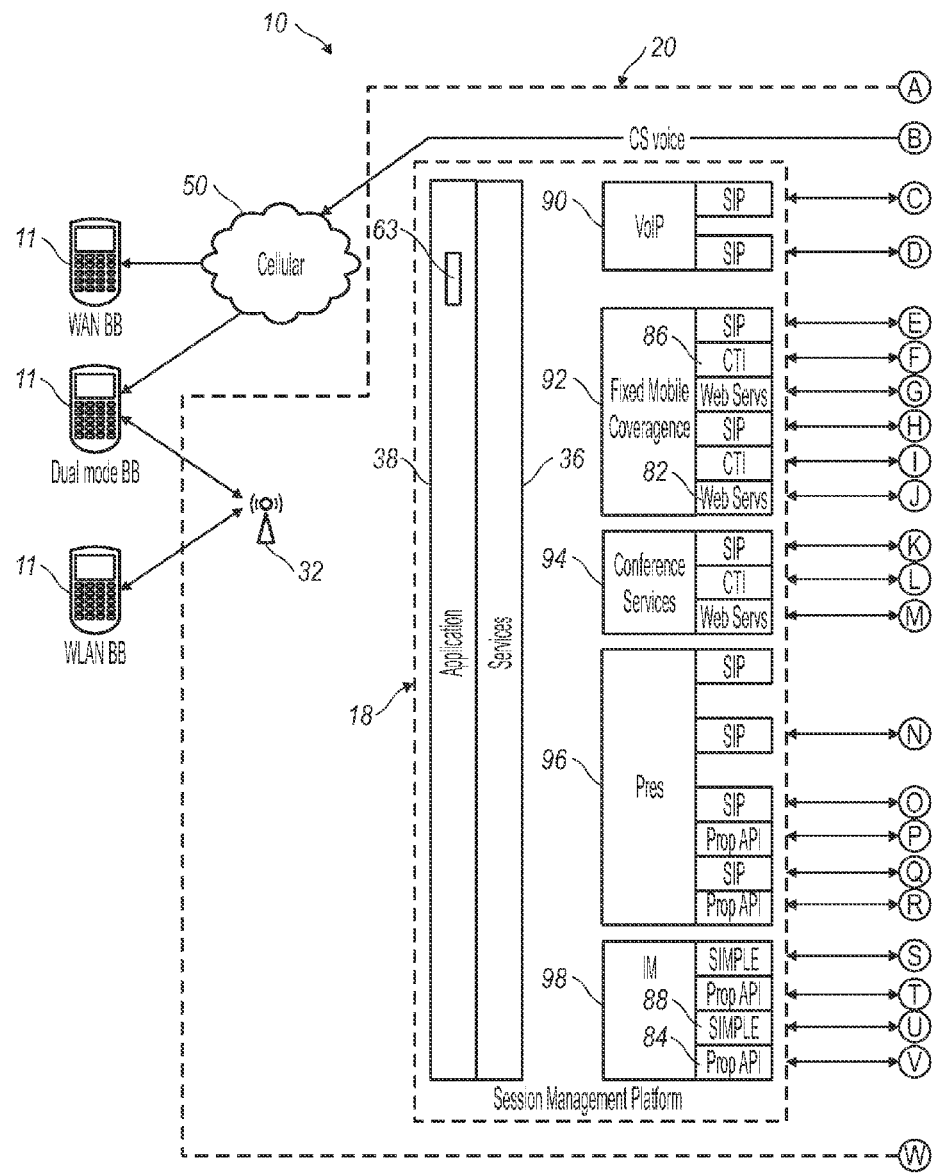
FIG. 5a shows further details of the enterprise communications platform of FIG. 3.
Figure 5B:
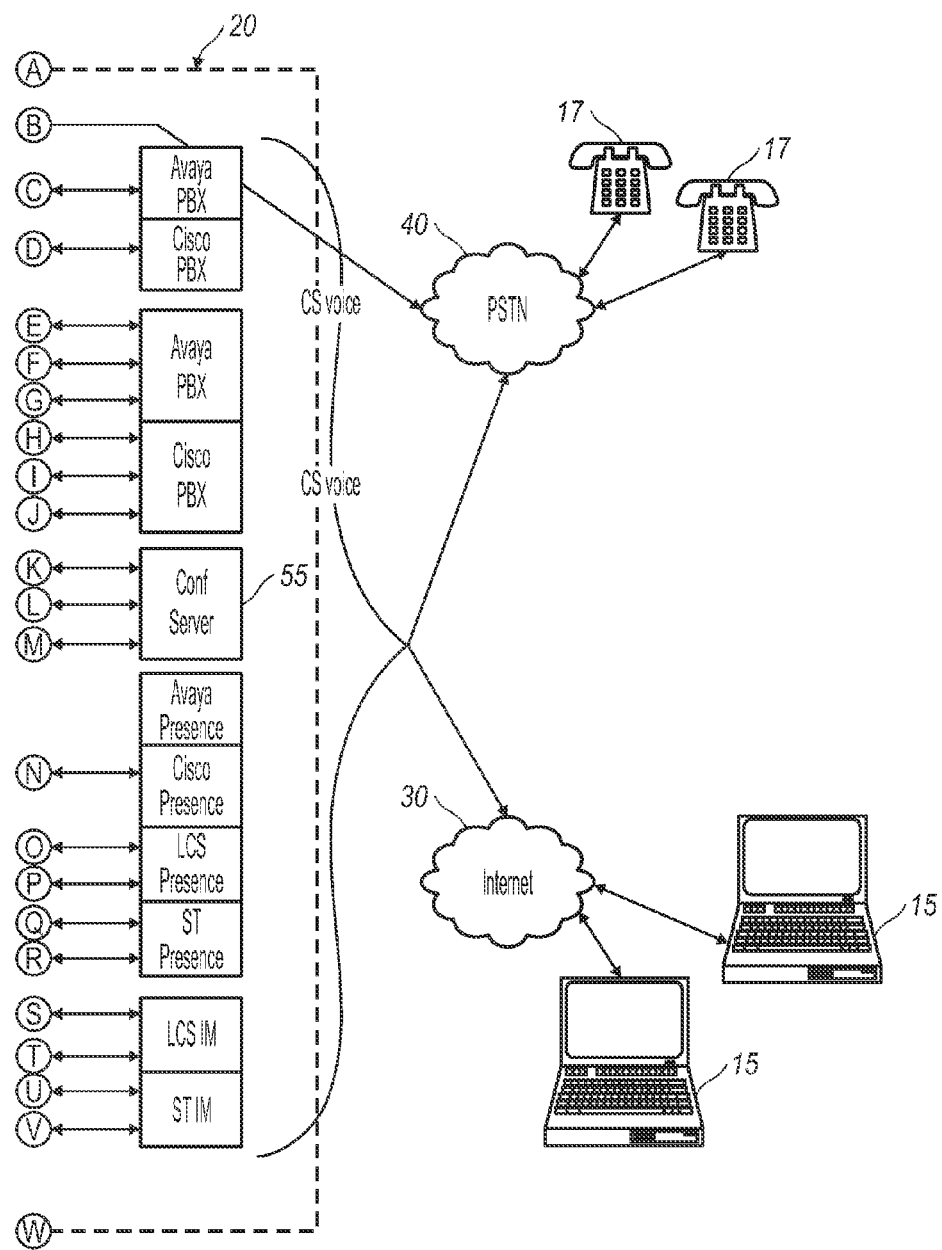
FIG. 5b shows further details of the enterprise communications platform of FIG. 3.

Reference is now made to FIGS. 5a and 5b, which show another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed to the communication devices and that leverage services and interface protocols for enabling the applications.

Specifically, the protocol layer 34 can include protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service or a conference service, or combinations thereof.

The application layer 38 may include a conference services application 63 that, together with the conference services enabler 94, enables multiple communication devices (including desk telephones and personal computers) to participate in a conference call through use of a centralized conference server 55. As seen in FIGS. 5a and 5b, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

Automatic Number Identification (ANI) is a feature of telephony intelligent network services that permits subscribers to display or capture the billing telephone number of a calling party. In the United States it is part of Inward Wide Area Telephone Service (WATS). The ANI service was created for long distance billing purposes. ANI has two components, information digits, which identify the class of service, and the calling party billing telephone number. As applicable to the present disclosure, the calling party billing telephone number can be a PLMN Number. ANI formats (both format length and information digit meaning) and specific uses of ANI-like information vary from country to country.

Enterprise resources, e.g., the SMP 18, often need to associate an incoming call with an enterprise user, e.g., to extend enterprise telephony services to a user's enterprise-associated mobile device, e.g., 11. Systems of the present disclosure use ANI, specifically the PLMN number portion, to associate incoming calls with an enterprise user.

It is not uncommon for enterprise users to use enterprise-associated mobile devices 11 in more than the country where the enterprise network resources are located; therefore the meaning of an ANI number, or ANI-like number, is not guaranteed to be distinguishable from the ANI number alone. When an enterprise-associated device 11 is in roaming mode (e.g., while in a foreign country), the foreign PLMN carrier may prefix additional numbers to the PLMN Number (which itself may vary in number of digits from country to country) to form the ANI number for that device 11 on the foreign PLMN carrier's network.

A hash table or hash map is a data structure that uses a hash function to map identifiers or keys (e.g., an enterprise user telephone number) to associated values (e.g., an enterprise user ID). The hash function is used to transform the key into the index (the hash) of an array element (the slot or bucket) where the corresponding value is stored. Ideally the hash function should map each possible key to a different slot index, but this ideal is rarely achievable in practice (unless the hash keys are fixed; i.e., new entries are never added to the table after creation). Typical hash table designs assume that hash collisions—pairs of different keys with the same hash values—are normal occurrences and must be accommodated in some way. In a well-dimensioned hash table, the average cost (number of instructions) for each lookup is relatively independent of the number of elements stored in the table. Some hash table designs allow arbitrary insertions and deletions of key-value pairs, at constant average cost per operation. In many situations, hash tables turn out to be more efficient than search trees or any other table lookup structure. In part for this reason, they are used in systems of the present disclosure to related a PLMN number of an enterprise-associated mobile device 11 to an enterprise user ID.

One approach to ANI/PLMN number matching is to directly compare the ANI number received from the PSTN with the PLNM numbers maintained in the enterprise network for all enterprise users. Since a single SMP 18 can support up to 10,000 enterprise users, the time to find a match can be long. The best case is that the match happens for the first enterprise user supported by the SMP 18. The worst case is that the match is found on the 10,000$^{th}$ user, or not found at all after comparing the ANI number to the PLMN number of all 10,000 users. The enterprise does not store the PLMN number and User ID in a hash map where the PLNM number is the key and the enterprise User ID is the value. One reason is that the ANI number typically contains information digits in addition to the PLMN number, and when the mobile device is roaming, it is not apparent from the ANI itself which digits are PLMN number digits and which are ANI information digits. The PLMN carrier adds digits to the beginning of the PLMN number to form the ANI number for billing purposes. In this case, the enterprise system has to use a pattern match for each PLMN number in the enterprise database, one by one or a linear search. It is disadvantageous for the enterprise system to store the PLMN number in a hashmap <key, value> pair as hashmap <PLMN nunber, User ID> because the hashmap does not provide an efficient pattern match capability. For a 10,000 user enterprise system, the worst case scenario is long because enterprise system needs to do a linear pattern match for 10,000 mobile numbers.

Embodiments of the present technology provide a matching of a portion of the ANI number against PLMN number, and eventually user ID, for enterprise system users.

Embodiments of the technology store the last n digits of PLNM number in a hash map with enterprise user IDs. Any entry in this hashmap can correspond to multiple enterprise users sharing the same last n digits of their PLMN number. One hashmap that can be used is hashmap <PLMN number last n digits, linklist of Enterprise User IDs> pair where the linklist stores all those enterprise user IDs having identical PLNM number last n digits. In many embodiments, n=6 is a good choice if enterprise users are not expected to use enterprise-associated mobile devices 11 in countries with less than six (6) digits in the PLMN number.

For example, User #1 has PLMN number "519-555-1234" and user #2 has PLMN number "647-855-1234." These two users have identical last six digits in their PLMN number. Therefore, one entry in the hashmap would be <"55-1234", Linklist {EnterpriseUserId=1, EnterpriseUserID=2}>.

In some embodiments, such hashmaps can be created for various n, thereby allowing various configurations of the technology responsive to the population of PLMN number formats of the enterprise users. In some embodiments, n is the lowest number of digits used by a PLMN of an enterprise user. For example, if an enterprise has one hundred (100) users—with fifty (50) being in the U.S. and having 10-digit PLMN numbers (e.g., (555)123-4567), forty nine (49) users being in country A that uses a 9-digit PLMN number format, and one user being in country B that uses a 6-digit PLMN, then an n=6 hashmap can be employed. It also can be desirable to create an n=9 digit hashmap in anticipation of the single country B user either leaving the enterprise or changing phone numbers. Further, it is desirable for the number n to be selected, e.g., by a system administrator, to be compatible with the PLMN number format of the country using the lowest number of PLMN number digits from among all the such countries.

When the enterprise system, e.g., the SMP 18 via the PBX 16, retrieves an ANI number from an incoming call, (e.g., 8191-519-555-1234), the enterprise system will determine the last six digits of the ANI (e.g., "55-1234").

The technology uses this partial ANI to search at the hash map. If found, the result is an entry where the key is the last n digits of the PLMN number ("551234") and the value is a linklist which contains all the User IDs for users who have identical last n digits of the PLMN number.

Next, the technology determined the user ID associated with the incoming call by comparing the full ANI number with each entry in the linked list. Since the size of linked list of a particular last n digits of the PLMN number is small, then the comparison is relatively short.

Figure 6:
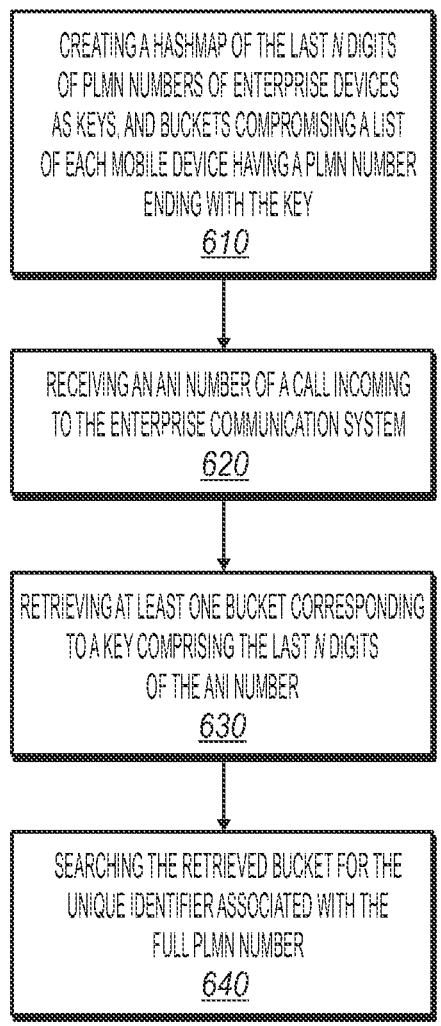
FIG. 6 illustrates methods of the technology.

Referring to FIG. 6, methods 600 of the technology are illustrated. In such methods, the technology creates 610 a first list relating each of a plurality of mobile devices of the enterprise communication system with at least one PLMN number of the enterprise-associated mobile communication devices. The technology also creates a hashmap 620. The hashmap includes keys comprising the last n digits assigned as a part of a PLMN number to at least one mobile device of the enterprise communication system, and corresponding buckets comprising a second list identifying each enterprise-associated mobile device having a PLMN number ending with the key. Upon receiving an Automatic Number Identification (ANI) number of an call incoming to the enterprise communication system 630, the technology retrieves 640 at least one bucket corresponding to a key comprising the last n digits of the ANI number. The technology then searches the retrieved bucket for the unique identifier associated with the full PLMN number.

The present technology can take the forms of hardware, software or both hardware and software elements. In some embodiments, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD. Both processors and program code for implementing each as aspect of the technology can be centralized or distributed (or a combination thereof).

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

The invention claimed is:

1. A computer-implemented method for identifying an incoming call as being from a mobile device of an enterprise communication system, the method comprising:
   creating a hashmap comprising:
      a plurality of keys, each key comprising the last n digits assigned as a Public Land Mobile Network (PLMN) number to at least one mobile device of the enterprise communication system, and
      a plurality of array elements, each array element:
         corresponding to a key, and
         comprising a list of unique identifiers having last n digits of PLMN numbers identical to the key;
   receiving an Automatic Number Identification (ANI) number of an incoming call to the enterprise communication system;
   retrieving the array element corresponding to the key comprising the last n digits of the ANI number with the last n digits of the ANI number being a portion of the ANI number; and
   searching the retrieved array element for the unique identifier associated with the full PLMN number.

2. The computer-implemented method of claim 1 wherein the unique identifier is an enterprise communication system user identifier.

3. The computer-implemented method of claim 1 wherein n is the smallest number of digits associated with PLMN number format of all enterprise associated mobile devices.

4. The computer-implemented method of claim 1 wherein n is a settable predetermined number of digits.

5. The computer-implemented method of claim 4 wherein n digits is six digits.

6. The computer-implemented method of claim 1 wherein the call is one of a voice call and a session-based communication.

7. The computer-implemented method of claim 1 further comprising communicatively coupling a mobile device initiating the incoming call and a mobile device associated with unique identifier.

8. A computer program product for identifying an incoming call as being from a mobile device of an enterprise communication system, the computer program product comprising:
   a least one non-transitory computer readable medium; and
   at least one program module, stored on the at least one medium, and operative, upon execution by at least one processor for:
      creating a hashmap comprising:
         a plurality of keys, each key comprising the last n digits assigned as a Public Land Mobile Network (PLMN) number to at least one mobile device of the enterprise communication system, and
         a plurality of array elements, each array element:
            corresponding to a key, and
            comprising a list of unique identifiers having last n digits of PLMN numbers is identical to the key;
      receiving an Automatic Number Identification (ANI) number of an incoming call to the enterprise communication system;
      retrieving the array element corresponding to a key comprising the last n digits of the ANI number with the last n digits of the ANI number being a portion of the ANI number; and
      searching the retrieved array element for the unique identifier associated with the full PLMN number.

9. The computer program product of claim 8 wherein the unique identifier is an enterprise communication system user identifier.

10. The computer program product of claim 8 wherein n is the smallest number of PLMN number format digits for the enterprise-associated mobile devices.

11. The computer program product of claim 8 wherein n is a settable predetermined number of digits.

12. The computer program product of claim 11 wherein n digits is six digits.

13. The computer program product of claim 8 wherein the call is one of a voice call and a session-based communication.

14. The computer program product of claim 8 further comprising communicatively coupling a mobile device initiating the incoming call and a mobile device associated with unique identifier.

15. A system for configuring a communication system, the system comprising:
at least one hardware processor,
at least one computer readable medium in communication with the processor;
at least one program module, stored on the at least one medium, and operative upon execution by the processor for:
creating a hashmap comprising:
a plurality of keys, each key comprising the last n digits assigned as a Public Land Mobile Network (PLMN) number to at least one mobile device of the enterprise communication system, and
a plurality of array elements, each array element:
corresponding to a key, and
comprising a list of unique identifiers having last n digits of PLMN numbers is identical to the key;
receiving an Automatic Number Identification (ANI) number of an incoming call to the enterprise communication system;
retrieving the array element corresponding to a key comprising the last n digits of the ANI number with the last n digits of the ANI number being a portion of the ANI number; and
searching the retrieved array element for the unique identifier associated with the full PLMN number.

16. The system of claim 15 wherein the unique identifier is an enterprise communication system user identifier.

17. The system of claim 15 wherein n is the smallest number of PLMN number format digits for the enterprise-associated mobile devices.

18. The system of claim 15 wherein n is a settable predetermined number of digits.

19. The system of claim 18 wherein n digits is six digits.

20. The system of claim 15 wherein the call is one of a voice call and a session-based communication.

21. The system of claim 15 further comprising communicatively coupling a mobile device initiating the incoming call and a mobile device associated with unique identifier.

* * * * *